United States Patent
Jung et al.

(10) Patent No.: US 9,338,245 B2
(45) Date of Patent: *May 10, 2016

(54) STATUS INDICATOR FOR COMMUNICATION SYSTEMS

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: Invention Science Fund I, LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/643,636

(22) Filed: Dec. 20, 2006

(65) Prior Publication Data
US 2007/0160024 A1    Jul. 12, 2007

Related U.S. Application Data

(63) Continuation of application No. 11/000,667, filed on Dec. 1, 2004.

(51) Int. Cl.
*H04L 12/28* (2006.01)
*H04L 29/08* (2006.01)

(52) U.S. Cl.
CPC ............... *H04L 67/24* (2013.01); *H04L 67/14* (2013.01); *H04L 67/36* (2013.01); *H04L 67/18* (2013.01)

(58) Field of Classification Search
USPC .......... 370/236, 252, 410; 455/424, 425, 422; 709/203, 224, 227
See application file for complete search history.

(56) References Cited

U.S. PATENT DOCUMENTS

| | | | |
|---|---|---|---|
| 5,255,307 A | 10/1993 | Mizikovsky | |
| 6,167,448 A * | 12/2000 | Hemphill et al. | 709/224 |
| 6,225,897 B1 | 5/2001 | Doyle | |
| 6,498,841 B2 | 12/2002 | Bull et al. | |
| 6,668,173 B2 | 12/2003 | Greene | |
| 6,917,672 B2 * | 7/2005 | Brown et al. | 379/188 |
| 6,957,045 B2 | 10/2005 | Haller | |
| 6,963,899 B1 * | 11/2005 | Fernandez et al. | 709/203 |
| 6,978,136 B2 | 12/2005 | Jenniges et al. | |
| 7,085,253 B2 * | 8/2006 | Yang | 370/338 |
| 7,103,333 B2 * | 9/2006 | Lazaridis et al. | 455/412.1 |
| 7,881,444 B2 | 2/2011 | Gogic | |
| 2001/0028703 A1 | 10/2001 | Katseff et al. | |
| 2002/0191639 A1 | 12/2002 | Norby | |
| 2003/0013461 A1 * | 1/2003 | Mizune et al. | 455/456 |
| 2003/0083011 A1 | 5/2003 | Haller | |
| 2003/0086402 A1 | 5/2003 | Yang | |
| 2003/0134626 A1 | 7/2003 | Himmel et al. | |
| 2004/0002329 A1 * | 1/2004 | Bhatia et al. | 455/422.1 |
| 2004/0024846 A1 | 2/2004 | Randall et al. | |
| 2005/0025301 A1 | 2/2005 | Vardi et al. | |
| 2005/0073964 A1 * | 4/2005 | Schmidt et al. | 370/260 |
| 2005/0122965 A1 * | 6/2005 | Heinla et al. | 370/357 |
| 2005/0124324 A1 * | 6/2005 | Thomas et al. | 455/412.1 |
| 2005/0191969 A1 | 9/2005 | Mousseau | |
| 2005/0249196 A1 * | 11/2005 | Ansari et al. | 370/352 |
| 2005/0262186 A1 * | 11/2005 | Szeto et al. | 709/203 |
| 2006/0025113 A1 * | 2/2006 | Nguyen et al. | 455/412.1 |
| 2006/0114920 A1 * | 6/2006 | Jung et al. | 370/410 |
| 2006/0168089 A1 | 7/2006 | Sampson | |

(Continued)

*Primary Examiner* — Feben M Haile (57) ABSTRACT

A variety of techniques and devices for acquiring user status information at a transmitting device to a receiving device, or vice versa, are provided.

21 Claims, 8 Drawing Sheets

(56) References Cited

U.S. PATENT DOCUMENTS

| | | |
|---|---|---|
| 2006/0209786 A1 | 9/2006 | Chambers et al. |
| 2007/0160024 A1 | 7/2007 | Jung et al. |
| 2007/0177619 A1 | 8/2007 | Jung et al. |
| 2009/0185670 A1 | 7/2009 | Staples |
| 2009/0221274 A1 | 9/2009 | Venkatakrishnan et al. |

\* cited by examiner

CALLING: JOE SMITH
TIME AT RECEIVER: 2AM

WE SUGGEST PLACING YOUR CALL LATER.
IF YOU MUST CALL NOW, DIAL 5
IF YOU WANT TO HANG UP, DO SO

CALLING: JOE SMITH
TIME AT RECEIVER: 2PM

MR SMITH IS IN CONFERENCE NOW, BUT CAN BE CALLED IN 1 HOUR

STATUS INDICATOR FOR COMMUNICATION SYSTEMS

TECHNICAL FIELD

The present application relates to status indicators.

BRIEF DESCRIPTION OF THE FIGURES

The use of the same symbols in different drawings typically indicates similar or identical items.

DETAILED DESCRIPTION

People are becoming more reliant upon telephones, cellular telephones, satellite telephones, e-mail, instant messengers, faxes, and other communication devices that operate in communication systems in which people can more easily communicate with each other from remote locations, time zones, or countries. Many communication devices or communication systems are becoming more complex, ubiquitous, and varied. The types of communication systems are rapidly changing as the communication technologies improve and change.

This disclosure provides a number of embodiments of status indicators that are included within communication devices that allow users to ascertain the user status information of users at remotely-located communication devices. Certain embodiments of the status indicator can provide such user status information prior to establishing the full communication between the communication devices, or even prior to the user at the receiving device being made aware of the potential communication. It might be rude (and additionally may hinder social or business contacts), to attempt to communicate with a person in the middle of the night at their local time, or when the contacted party is busy.

Many people rely heavily upon scheduling and/or communication programs that indicate when they are attending a meeting, are in a conference, are away from work, or are otherwise busy. People are sometimes less receptive to receiving outside phone calls or other communications when they are busy at work, consulting with other people, or away on a vacation. Several embodiments of the present disclosure may be integrated with a variety of programs that are commercially available including, but not limited to, email/scheduling/calendar programs such as Outlook or Outlook Express® which is produced and distributed by Microsoft, instant messaging programs including, but not limited to, AOL's Instant Messenger and Microsoft's Instant Messaging, etc. In addition, various embodiments of the present disclosure may be integrated with certain Internet chat rooms that provide for substantially instantaneous interactive communication between multiple individuals. Certain embodiments of the present disclosure provide a mechanism to indicate to a communicating party regarding whether it is a suitable time to contact another person by cellular phone, e-mail, or other communication device. The herein-described integration is within the ambit of those skilled in the art.

In addition, certain embodiments of herein-described status indicators allow users to respond to telemarketers; calls from potential communicators; calls from past, present, and/or potential relationships; etc. without the user at the receiving device having to communicate directly. Additionally, certain embodiments of the herein-described status indicators support filtered broadcasts. For example, a commercial or other institution may call up a number of their potential shoppers (e.g., attention Kmart shoppers, certain advertisers using spam, or certain credit card companies, or certain instant message communications such as could be provided by SMS) with the expectation that a low percentage of the called individuals will respond positively. The status indicator can leave a message or some user status information that is tailored to a particular caller, or a particular type of caller.

A variety of status indicators that are capable of providing a variety of user status information are described in this disclosure. In one embodiment, a person making a call over an interactive communication device, such as a cellular telephone to a remote user, can utilize a status indicator located in the cellular telephone that indicates the local time, or the time zone of the user of a receiving device. Such status indicators can assume a wide variety of configurations. Other embodiments of the status indicators that are associated with cellular telephones may display an icon such as the sun in the middle the sky, the setting or rising sun, or the moon to indicate the time at a remotely located telephone that is being called. For example, one embodiment of status indicator can provide either an analog or digital display of the time, or generally display the time (e.g., too late to call) at the called device.

This disclosure provides a number of embodiments of status indicators that allow one user to determine the configuration or user status information of a remotely-located communicating device. Such embodiments may prove useful when the transmitting device is incapable of communicating with the receiving device, or vice versa. For instance, consider those instances where it may not make sense to attempt to communicate with a remotely-located device that is not configured to receive the communication (although, in some instances it might). For example, certain embodiments of cellular phones provide a camera feature that can transmit an image to remote devices such as certain computers or cellular phones. In some instances it may not make sense to transmit an image formed by such a cellular phone to a remote user if the remote device was not configured to receive such an image (although, in some instances it might). Another embodiment of status indicator may include a device indicator that indicates that the receiving device is a type that would be capable of performing or transmitting a particular communication [e.g., if the other computer had a limited input device, such as certain Personal Digital Assistants (PDAs) that have a limited data flow].

Figure 1:
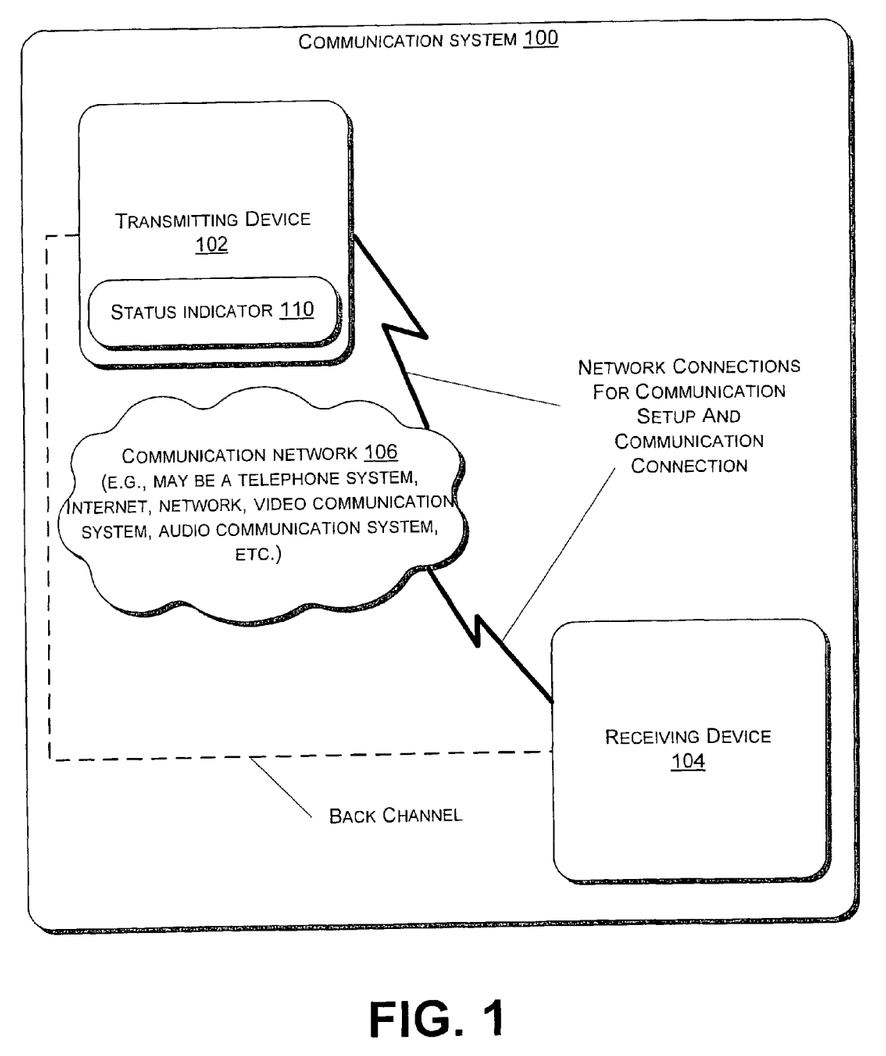
FIG. 1 shows a generalized schematic diagram of one embodiment of a communication system that includes one embodiment of a status indicator.

FIG. 1 shows a block diagram of a generalized embodiment of a communication system 100. The communication system 100 can be configured in different embodiments as a telephone system, a cellular telephone system, a satellite phone system, or Voice Over Internet Protocol (VOIP) system, a computer-based system, an Internet system, an e-mail system, an instant messaging system, a global positioning system (GPS), an audio system, a video system, a teleconferencing system, a videoconferencing system, a PDA system, any similar or analogous communication system, or any combination of the above systems or derivations from these systems. It is understood that the configuration, use, and/or operation of many embodiments of communication systems and/or communication devices may develop in the future as the technology further develops. It is also envisioned that the use of status indicators, as described in this disclosure, can be adapted to changes in configurations, uses, and operations.

The embodiment of the communication system 100, as described with respect to FIG. 1, includes a transmitting device 102, a receiving device 104, and the communication network 106 that allows the types of communication between the transmitting device 102 and the receiving device 104 as described in this disclosure. Also shown in dotted lines (in FIGS. 1 and 11) is a back channel connection that provides an operational coupling through which data can be transmitted between the transmitting device 102 and the receiving device 104. In certain embodiments, the back-channel connection can be integrated within the communication network 106. Within this disclosure, the term "transmitting device" applies to those devices that initially contact at least one other device to establish a communication therebetween. Within this disclosure, the term "receiving device" pertains to those devices to which the original contact is being made from at least one transmitting device. In many embodiments of the present disclosure, both the transmitting device 102 and the receiving device 104 can provide both transmitting and receiving functions to provide interactive communications.

While the associated figures show, and this disclosure describes with respect to the figures, a single transmitting device 102 communicating relative to a single receiving device, it is to be understood that certain embodiments of the communication system 100 can be configured to include a number of receiving devices 104 and/or a number of transmitting devices 102. For example, in one embodiment, the transmitting device 102 can be configured to attempt to establish a broadcast to a number of receiving devices 104 substantially simultaneously, and thereupon receive a number of return status indications (such as would be used by broadcasts, e.g., by credit card vendors).

One embodiment of the transmitting device 102, as described with respect to FIG. 1, includes a status indicator 110. Many embodiments of the status indicator 110 indicate the user status information of a user who is located at the receiving device 104 to a user at the transmitting device 102. There are a large variety of types of user status information that can be indicated by the status indicator 110 that include, but are not limited to: the location of the user at the receiving device 104, the time of day of the user in the receiving device, the type of the receiving device, the configuration of the receiving device, the potential data flow to or from the receiving device, the current time zone for a user in the receiving device, the time zone at which the user at the receiving device is normally located (e.g., based for example on the area code of the receiving device, the home address of the user of the receiving device, or the indicated location as determined by the receiving device), the city at which the receiving device is located, and/or a condition such as the temperature or weather at the receiving device 104. There are also a variety of techniques by which the user status information can be projected to the user that include, but are not limited to, displaying the user status information on a screen, projecting a voice or audio to indicate the user status information, or providing one or more lit indicators that each correspond to a particular status to present the user status information such as "busy" or "available for contact". In one embodiment, the receiving device 104 includes a Global Positioning System (GPS) that provides positional information or locational information about the receiving device. Other position-determining devices that obtain the position or location of the receiving device 104 are within the intended scope of the present disclosure.

In certain embodiments, the status indicator 110 acquires such user status information as whether the status indicator 110 is configured to act within the transmitting device and/or the receiving device such as a telephone, a cellular telephone, a computer-based device, an e-mail device, a personal digital assistant (PDA), a teleconferencing device, an audio device, or a video device, etc. The type of the receiving device can be determined during an initial setup portion of the communications between the transmitting device and the receiving device using the status indicator 110 to ensure a suitable communication. For example, in some instances it may not make sense to attempt to download a large image data file to a voice-only cellular telephone that is incapable of displaying such a file (although, in some instances it might). It also may not make sense to attempt to communicate with a computer-based device (such as a PDA) if either the transmitting device or the receiving device has insufficient processing, receiving, data storage, or transmitting capabilities to suitably process the data it would receive (although, in some instances it might).

It may also be desirable to transmit such configuration user status information to certain embodiments of the status indicator 110 to indicate the user status information of the receiving device 104 and/or the user status information of the user of the receiving device. For example, the receiving device 104 may be configured to include calendar-based scheduling software, such as Outlook. The user at the receiving device 104 may select to provide input to a remote caller at a transmitting device indicating that he/she is busy at a particular time, such as being in a meeting. In one embodiment, it may be desirable to transmit the duration of the meeting of the receiving device 104 to the status indicator 110 such that the duration is displayed at the transmitting device 102. The particular content of the user status information that is indicated over the status indicator 110 at the transmitting device can be determined largely based on user input, device type, and/or device configuration of the transmitting device 102 and/or the receiving device 104.

Figure 2:
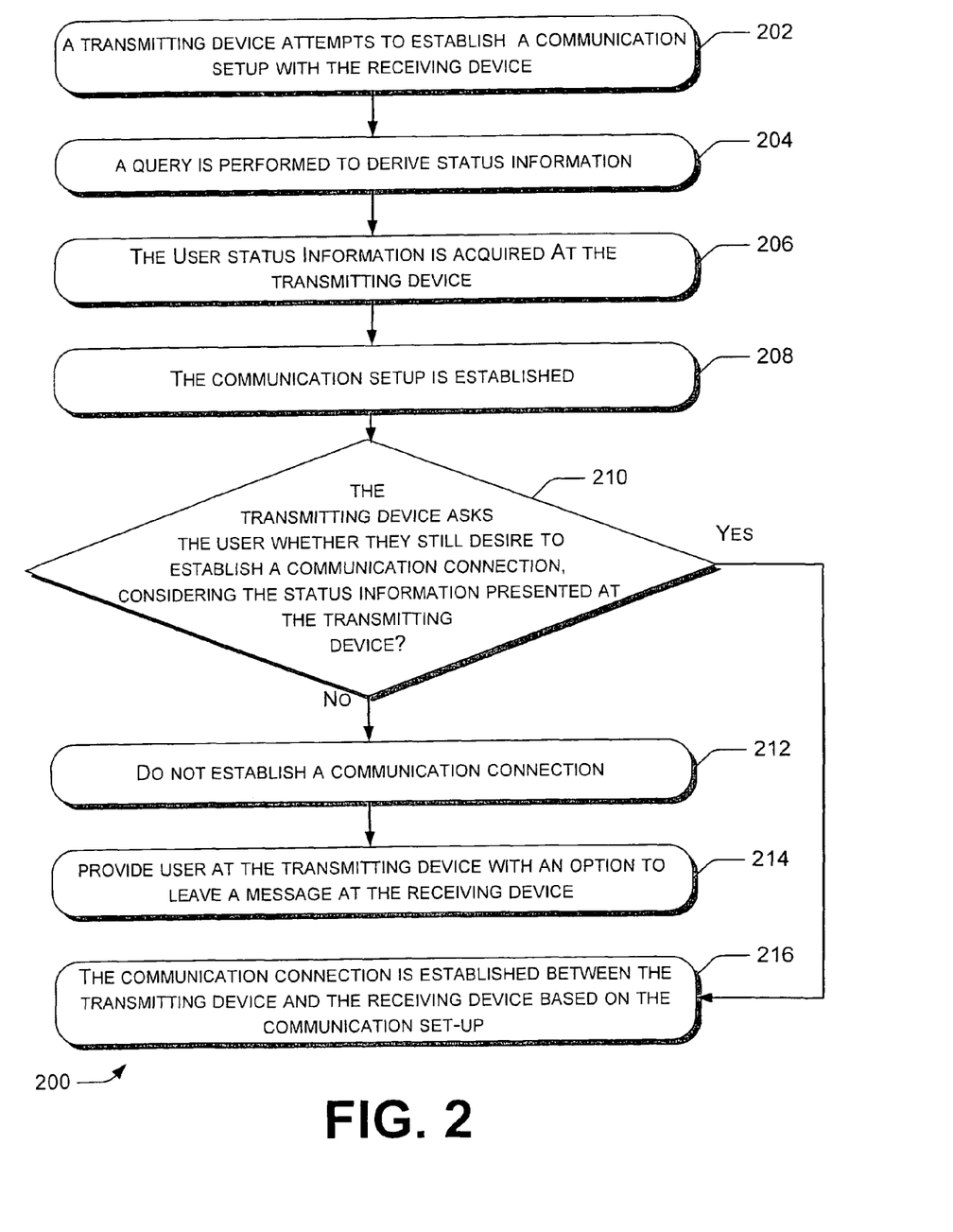
FIG. 2 shows a flow diagram of one embodiment of a communication flow chart that involves the status indicator as shown in FIG. 1.
Figure 12:
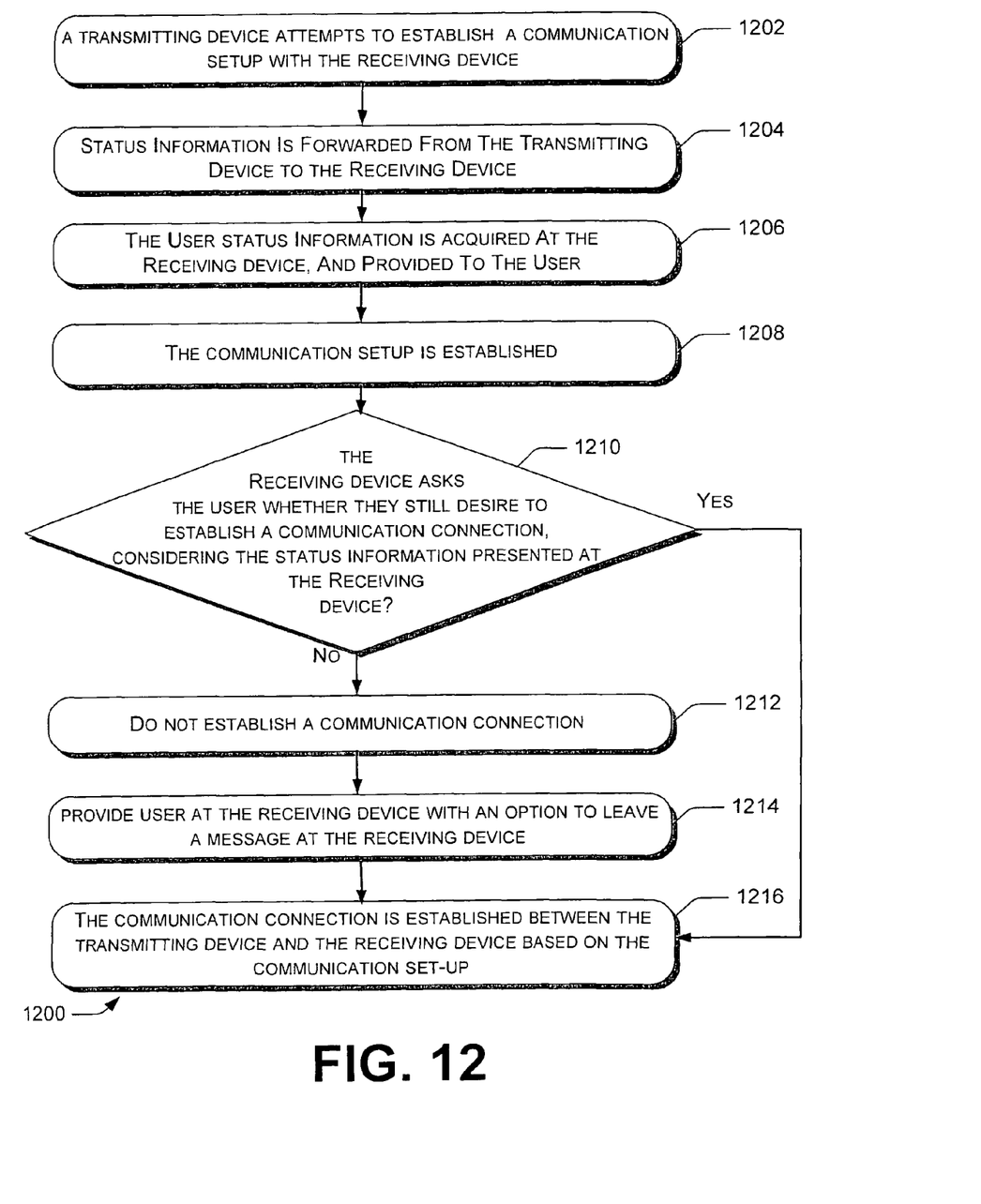
FIG. 12 shows a flow diagram of another embodiment of a communication flow chart that involves the status indicator.

FIG. 2 shows a flow diagram of one embodiment of a communication flow chart 200 that establishes a communication between the transmitting device 102 and the receiving device 104 of the communication system 100 using the status indicator 110 as described with respect to FIG. 1. In this disclosure, the flow charts such as shown in FIGS. 2 and 12 are intended to apply to both processes (such as are often protected by method claims or means plus function claims), or structure (such as are often protected by apparatus claims or means plus function claims) as indicated by context. More particularly, one embodiment of such a structure represents a general purpose computer such as described with respect to FIG. 10 that runs a computer program to perform a process outlined by the flow chart. The embodiment of the communication flow chart 200 includes a step 202 in which the transmitting device 102 attempts to establish a communication setup with the receiving device 104. The particulars of the communication setup depend largely upon the particulars of the communication system 100. In certain embodiments of communication systems 100 that are configured to support such telecommunication devices as cellular telephones, conventional telephones, facsimile machines, satellite telephones, or other types of phones, the communication setup can be characterized as those steps that occur prior to the transmitting device dialing, or somehow otherwise establishing, the communication connection or coupling to the receiving device. The telephone setup technique continues in which the telephone call routing is determined. During the call routing, certain information including the user status information in certain embodiments can be provided from the receiving device back to the transmitting device. The telephone setup techniques often continue to those portions of the telephone communication in which a ringing signal is transmitted from the transmitting device to the receiving device.

In those embodiments of communication setup in which the communication system 100 includes a computer-based system, the communication setup can be characterized as a computer setup or a network setup. Certain embodiments of the computer setup determine whether the user at the receiving device is busy, or alternatively whether the time or user equipment is inappropriate to establish a direct computer communication Additionally, in certain embodiments, the computer setup determines a routing path for the communication through the communication system.

Many embodiments of the computer communications are characterized as responsive communications, which, for purposes of this disclosure, indicate that the communications between the user at the transmitting device and the user at the receiving device respond to each other in a substantially real-time fashion. Examples of such responsive communications include, but are not limited to: instant messaging, Internet chat rooms, and telephones. Certain embodiments of conventional e-mail follow a non-responsive format where a first computer-user sends an e-mail to a second computer user, and then waits for some undetermined duration for the response. Additionally, conventional e-mail can be configured to allow two remote users to communicate responsively. There are also a variety of responsive e-mail formats and techniques that are within the scope of the present disclosure, and also certain embodiments of non-responsive e-mail formats are within the scope of the present disclosure.

For example, during these responsive communications, the user at the transmitting device can send an e-mail or other communication, which may be very quickly responded to by the user at the receiving device, etc. as is typical with two-way communications. Since many embodiments of such direct computer communications often rely upon such quick responses between the users at the transmitting and receiving devices, it is important to ensure that both users can carry on the communications, both the transmitting and receiving devices are capable of carrying on the communication, or it is a suitable time for the communication (e.g., not in the middle of the night).

The embodiment of the communication flow chart 200 as described with respect to FIG. 2 continues to step 204 in which a query is performed to derive user status information. The term "query" is typically applied to data processing within a computer or communication system, and often database processing operations in particular. Performing a query on some data acts to filter the data being queried into that filtered data that satisfies the query. Within this disclosure, the term is also intended to apply to such signaling and/or monitoring techniques that may be applied to determine user status information of other embodiments of the communication systems 100 of the present disclosure, such as in telecommunication devices. The derived user status information corresponds to that type of information which may be displayed or projected over the different embodiments of the status indicator 110, as described with respect to FIG. 1. As such, in many embodiments, the derived user status information may apply to the user at the receiving device and/or the receiving device itself.

Performing a query on some data acts to filter the data being queried into that filtered data that satisfies the query. For example, filtering of the user status information relates, at least in part, to considering logging attempts and one or more persons trying to view such information.

The query that is performed to derive the user status information, as described with respect to step 204, is in many embodiments performed on data stored in a database (not shown). Many embodiments of such queries may rely upon such database query software languages as Structured Query Language (SQL) that is based on the attempted communication being established from the transmitting device. In certain embodiments, at least a portion of the data that is included in the queried database is stored in the receiving device 104. In other embodiments, at least part of the data that is included in the queried database is stored at a network location that is located at some operational location between the receiving device 104 and the transmitting device 102. Such locating of the data and/or databases at one or multiple potential locations across the communication system 100 generally becomes better understood considering networking techniques and network devices.

The embodiment of the communication flow chart 200 as described with respect to FIG. 2 continues to step 206, in which the user status information of the receiving device 104, such as can be presented are displayed in the status indicator 110 of the transmitting device, is acquired at the transmitting device 102. Such acquiring of the user status information at the status indicator 110 in many embodiments acts to derive the contents of the user status information in response to the query of step 204 (or alternatively, the response to signaling or other communications). Thereupon, the user status information is provided over the status indicator 110 to a user at the transmitting device 102. The technique by which the user status information is provided depends largely on the configuration or type of the status indicator, and may include but is not limited to displaying the data on a display, projecting the data as voice or audio, etc. For example, the user status information is provided over the status indicator 110 to a user at the transmitting device 102 can require adjusting a granularity of the user status information based, at least in part, on an identity of the transmitting device. Many embodiments of the communication flow chart 200 end at step 206 at which the user status information of the user at the receiving device is provided to the transmitting device. Following the acquiring of the user status information at the status indicator 110, as described with respect to step 206, certain embodiments of the communication flow chart 200 continue to step 208 in which the communication setup (as attempted in step 202) is established.

In the embodiment of communication flow chart 200 as described with respect to FIG. 2, the communication flow chart continues to decision 210 in which the user at the transmitting device is asked whether they still desire to establish a communication connection or coupling considering the user status information that has been presented to the transmitting device. If the answer to the decision 210 is yes, then one embodiment of the communication flow chart 200 continues to step 216 in which the communication connection or coupling is established between the transmitting device and the receiving device based on the communication setup.

For those embodiments of the communication system 100 that are telephone-based, the communication connection may continue, for example, by forwarding a ringing signal from the transmitting device to the receiving device that causes the receiving telephone to ring. After the user at the receiving device picks up the ringing telephone, the communication connection is thereupon acquired or established. In those embodiments of the communication system 100 that are computer-based, a message such as by e-mail can be provided to indicate the particulars of the user status information of the communication.

For those embodiments of the communication system 100 that are computer-based, the communication connection may provide such features as instant messaging, chat rooms, and responsive e-mail communications between the transmitting device and the receiving device. VOIP telephone communications may be considered as one embodiment of a hybrid communication connection that includes both computer-based and telephone-based communication aspects.

In certain embodiments of the communication flow chart 200 in which the answer to the decision 210 is no, the communication flow chart continues to step 212 in which the communication system does not establish a communication connection. Following step 212, in one embodiment of the communication flow chart 200, a user at the transmitting device is provided with an option to leave a message at the receiving device in step 214, the format and type of the message can vary depending upon the embodiment of the status indicator.

In certain embodiments of the communication flow chart, the user status information of the user at the receiving device can be provided over the status indicator 110 with an indication of a suitable time to make a similar contact with the user at the receiving device. For example, the user status information at the status indicator may indicate that it is 3 a.m. at the receiving device, and the communication should be attempted later, such as in six hours or later. As such, the communications between the transmitting device and the receiving device can be made conditional upon an indication that is provided by the status indicator, or alternatively such calls can be deferred by the user of the transmitting device until a more suitable time for the user of the receiving device.

Figure 3:
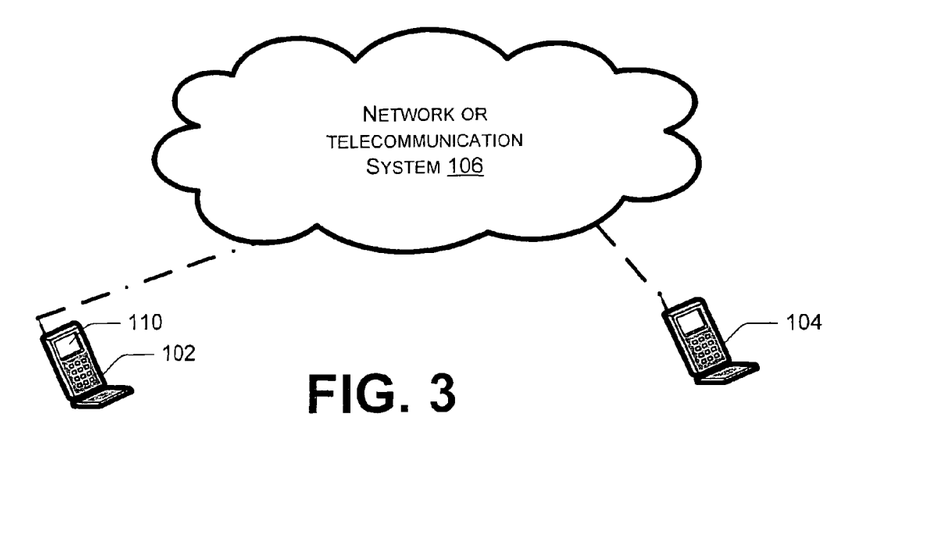
FIG. 3 shows a perspective view of one embodiment of a portion of a pair of communication devices, one of the communication devices includes a status indicator.

FIG. 3 shows another embodiment of the communication system 100, in which both the transmitting device 102 and the receiving device 104 are configured as cellular telephones. In the embodiment of the communication system 100, the communication network 106 includes a telecommunication network that is generally known, and will not be further described herein. In one embodiment, the status indicator 110 is provided as portion of a display 302.

Certain embodiments of the status indicator can include a variety of icons or shapes to project the user status information of the receiving device to the transmitting device. For example, the display can provide an indication of the time at the receiving device using either an icon that indicates the time of day, displays the actual time at the receiving device, or alternatively indicates the location of the receiving device. One embodiment of an icon would include, e.g., a moon icon symbol that indicates that it is nighttime at the receiving device, while a sun icon could be used to indicate that it is daytime at the receiving device. The time of day to be further modified by, for example, using an icon of the setting sun indicating that it is twilight at the receiving device. A large variety of icons, time zones, times, location, and other indications that relate to the receiving device that are displayed at the transmitting device are within the intended scope of the present disclosure.

Figure 4:
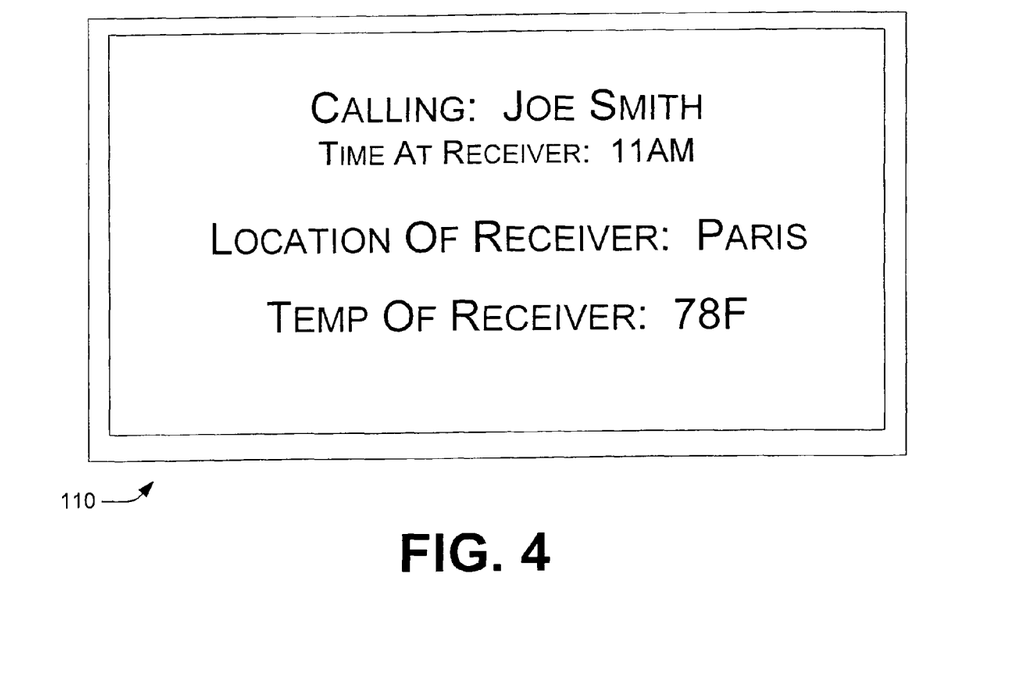
FIG. 4 shows one embodiment of a status indicator that can be included in one of the communication devices.
Figure 5:
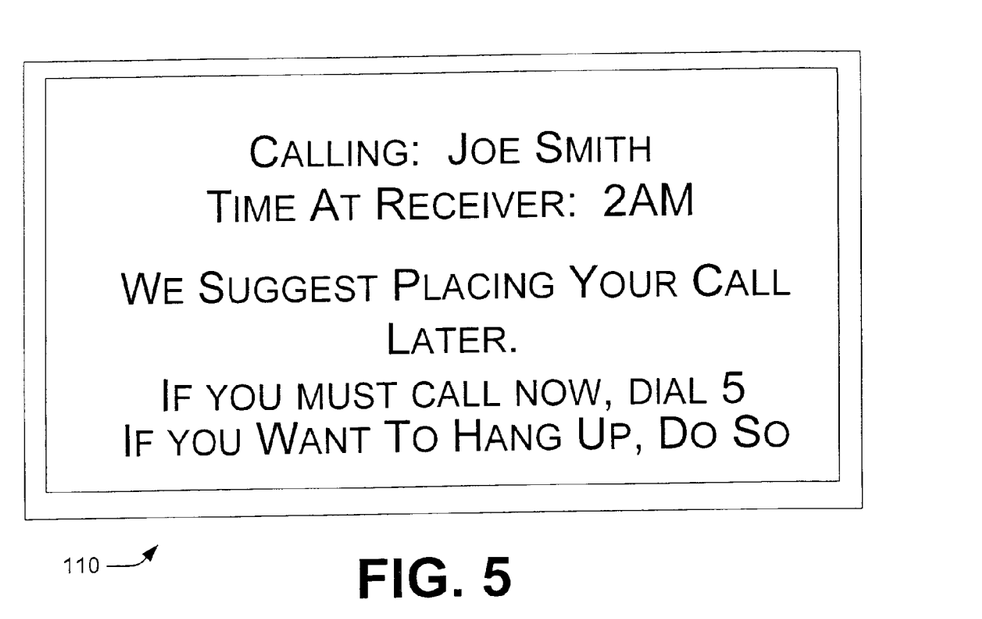
FIG. 5 shows another embodiment of a status indicator.
Figure 6:
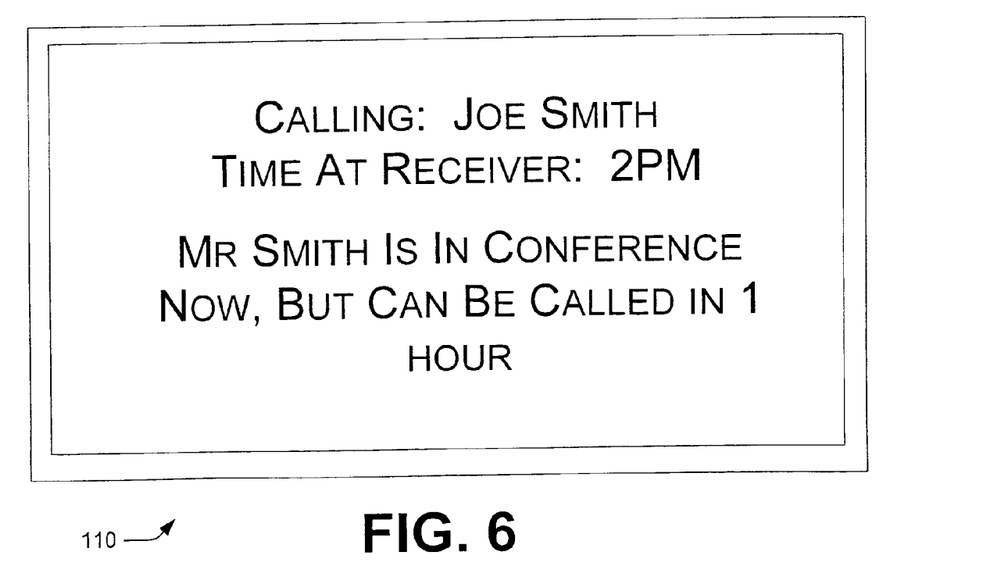
FIG. 6 shows yet another embodiment of a status indicator.

A number of status indicators 110 that display user status information are described with respect to FIGS. 4, 5, and 6. The embodiment of the status indicator described with respect to FIG. 4 indicates a name of the party being called (e.g., Joe Smith), a local time at the receiving device (e.g., 11:00 a.m.), a location of the receiving device (e.g. the party being contacted is currently in Paris), and a condition including the temperature at the receiving device (e.g. the current temperature at the called cell phone in London, England is 78° F.). Certain embodiments of the status indicator 110 would provide all of the information as described with respect to FIG. 4, while other embodiments of the status indicator would only provide some of this information.

It is envisioned that user status information can be provided with respect to some location or landmark. For example, a status indicator may indicate that a user is located at some landmark or location. Within this disclosure, the terms landmark or location may be applied to some geometrically broad term such as in a specific time zone, a specific city, or a specific country. Alternatively, much narrower landmark or location terminology may be used. For example, a user of a communication system having a status indicator can be described as being located in a particular commercial location (e.g., a Starbucks™ coffee shop or at Sears™), at a particular longitude and latitude coordinate or street address location such as provided by GPS or other positional systems, at a work location, or at a specific address. The specificity of the location or landmark can be determined by input from the user at the receiving device, input from the user at the transmitting device, and/or input from a system administrator.

While one embodiment of the status indicator only indicates the time at the receiving device, another embodiment would indicate the phone number being called, and yet another embodiment would include the location of the receiving device. Another embodiment of the status indicator would indicate the time zone at which the receiving device is located. Input by the users at both the transmitting device and the receiving device can determine the particular user status information displayed over the status indicator.

The embodiment of the status indicator 110 as described with respect to FIG. 5 differs from the status indicator of FIG. 4 in that the call to the receiving device is being made in the middle of the night in the FIG. 5 embodiment. In the FIG. 5 embodiment of the status indicator, the status indicator suggests placing the communication later such as at some convenient time for the user of the receiving device. In this disclosure, the term "convenient" time generally covers re-establishing communication when any attribute of the receiving device changes; for example, the time at the receiving device changes, the weather changes, or a meeting ends. The particular technology associated with delaying a communication varies based upon the particular communication system being used. For example, certain embodiments of computer-based communication systems could delay the transmission of a communication for a prescribed duration until a suitable e-mail or instant messenger would be transmitted. In certain telecommunication systems, by comparison, an individual may have to wait for some duration or a particular time to attempt the communication again.

In one embodiment of the status indicator, the user has an option. For certain types of emergency calls, the user can dial some prescribed number (e.g., 5) and a call may be provided to the user at the receiving device regardless of the time at the receiving device. Alternatively, if the call is not an emergency call, the status indicator can either indicate an option to leave a message (e.g. by dialing some alternative number such as 6). Alternatively, the status indicator can indicate when the user at the receiving device will be able to receive the call (e.g., call Joe Johnson again in four hours at 9:00 am, Joe's time). For certain communications such as telecommunication-based communications, the user at the transmitting device can hang up to end the attempt to communicate with the user at the receiving device. In computer-based communications, the user of the transmitting device can be provided with the option of altering the contents of the communication depending upon the present status (e.g., leave a message), or the time at which the communication is transmitted.

Another embodiment of the status indicator 110 is described with respect to FIG. 6, in which the status indicator indicates the user at the receiving device is busy. In one instance, the status indicator can provide an indication of when the user at a receiving device can be called back (e.g., in one hour). The particular user status information that is being displayed on the status indicator at the transmitting device can in certain embodiments be selected based upon user input at the receiving device, user input at the transmitting device, user input at some network location between the transmitting device in the receiving device, or some other input to some network or device locations.

Such determination of the type of user status information that would be provided to a transmitting device can be determined on a case-by-case basis as a particular communication setup is being received at a receiving device, or alternatively can be established beforehand prior to the receiving the communication setup at the receiving device. For example, a user at the receiving device can determine that they do not want their particular location to be sent out to any caller, or only to selected callers. Alternatively, a user at the receiving device can maintain an override in which they determine the particular user status information to be transmitted to any particular caller. In certain embodiments, a user at the receiving device can even transmit inaccurate user status information, such as indicating that they are located at some different location from where they are actually located in those instances that they do not wish to have the user at the transmitting device know where they are located. In other instances, the user at the receiving device can determine that it is acceptable to output their general location, or a more precise location, to either a specific caller, or alternatively, any type of call that is being received. There are a wide variety of status indicator configurations and variations that can be controlled by the users at the transmitting device and/or the receiving device. In one embodiment, the user at the receiving device can input data in the receiving device to only respond to certain phone numbers, or alternatively wholly respond to certain callers, or callers from certain locations.

Figure 7:
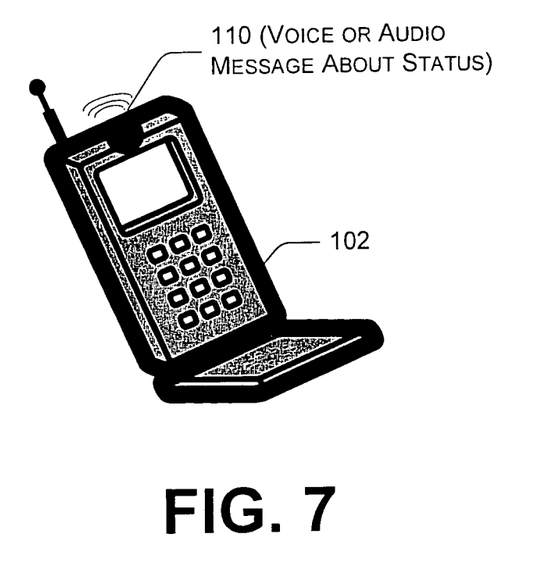
FIG. 7 shows another embodiment of a status indicator which is audio or voice based.

Of the above-described embodiments of the status indicator 110, the user status information of the user at the receiving device 104 is displayed on the display at the transmitting device 102. There are a wide variety of other embodiments of status indicators. For example, FIG. 7 shows an alternate embodiment of the status indicator in which the user status information is protected as audio or voice to a user that is located at the transmitting device. For example, similar user status information as described with respect to the embodiments of this status indicators of FIG. 4, 5, or 6 can be protected as audio or voice as user status information at the transmitting device.

Figure 8:
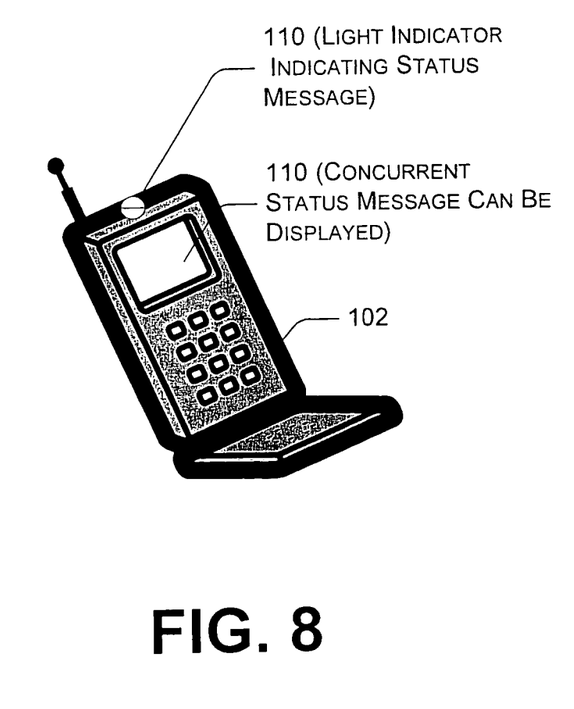
FIG. 8 shows another embodiment of a status indicator having a status light.

Alternatively, one relatively simplified embodiment of a status indicator that is described with respect to FIG. 8 is provided in which a light or other indicator that indicates that the user at the receiving device is busy, is at a location or time at which the user should presently not be disturbed, or has some particular status that is identified with that indicator. The particulars about the user status information can be displayed over another display that is included in the status indicator (e.g., a message that is displayed over the cellular telephone). Different embodiments of the status indicator can be configured relatively simply or with more complexity depending upon the desired purpose.

Figure 9:
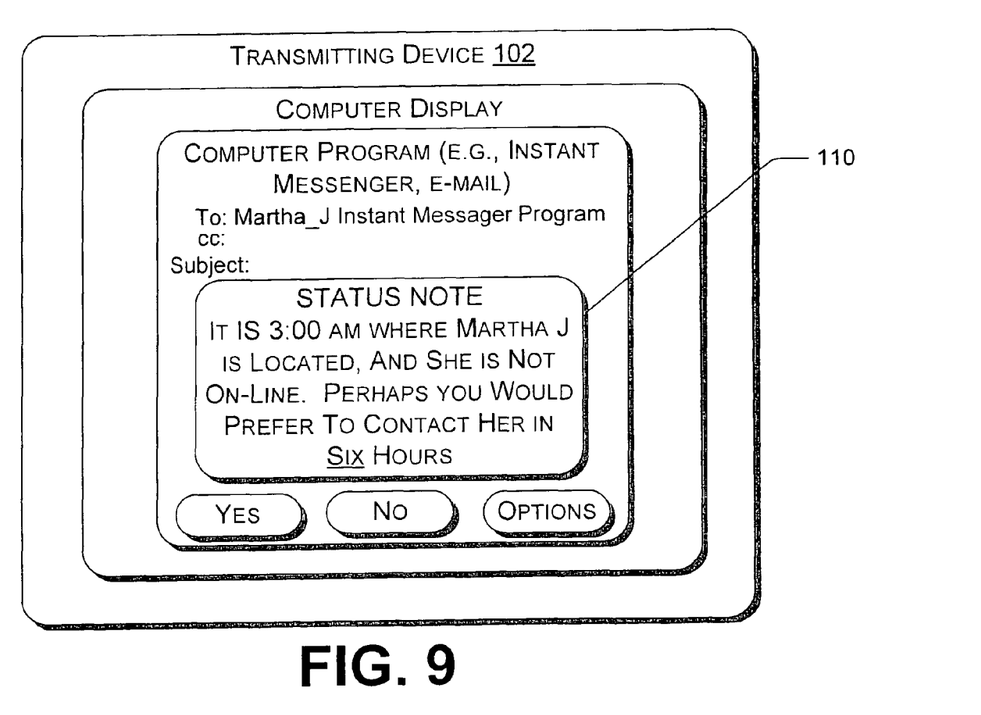
FIG. 9 shows yet another embodiment of a status indicator which runs on a computer display.
Figure 10:
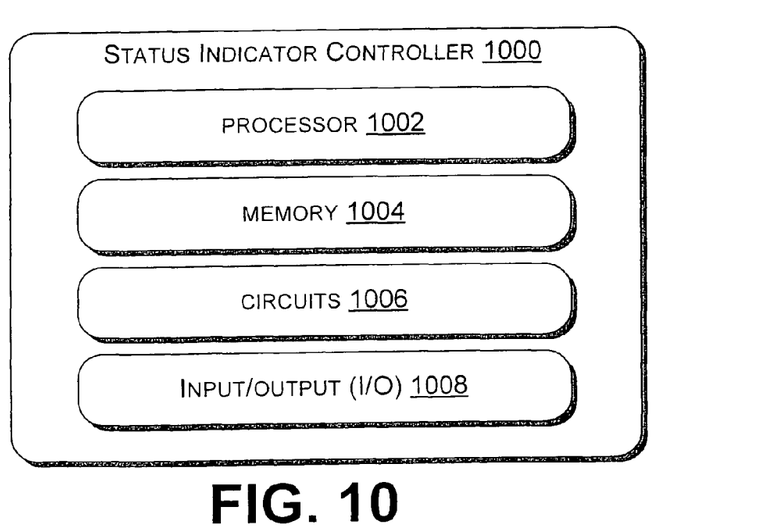
FIG. 10 shows a block diagram of an embodiment of a status indicator controller.

FIG. 9 shows one embodiment of a status indicator that is applied to a display 902 for a computer-based communication system. The display 902 displays a communication (e.g., e-mail) window 904. In one embodiment, within the communication window 904 is a status indicator window 906 that indicates the user status information at a receiving device (e.g., a receiving computer). The status indicator window 906 indicates, for example, that the user at the receiving device is busy at the current time, and can be contacted in 20 minutes. The status indicator can also indicate that, for example, it is the middle of the night for a user with the receiving device. Different embodiments of the status indicator, as indicated in FIG. 10, can be configured to run as a feature or portion of an application program such as e-mail, instant messaging, etc. Alternatively, the status indicator can be provided as a distinct program. Many embodiments of the status indicator that are computer-based can often display more user status information than phone-based embodiments since the dimensions of current displays for computers are generally physically larger than current displays for phones.

A variety of different embodiment of switches, buttons, mouse-click mechanisms, voice prompts, timeout mechanisms, and the like can be provided to allow a user at the transmitting device to respond to user status information that is input over the status indicator. In certain embodiments of phone-based status indicators, for example, the user may be prompted to depress certain numbers from a numerical keypad to indicate their selections of how to respond to the user status information. For certain embodiments of computer-based status indicators, a user at the transmitting computer may be prompted to click on certain icons or depress soft-buttons to input their selections. In certain embodiments of phone-based and/or computer-based status indicators, hard buttons can also be used to provide user selections from the status indicator. Within this disclosure, the term "hard button" indicates a button which is pressed manually, such as the key on the telephone. The term "soft button" implies a button that exists on the computer display or monitor, which is pressed using an input/output device such as a mouse or a keyboard. Other embodiments can utilize a time-out mechanism to provide an appropriate response at a desired time such as after a particular ring (e.g., the second ring) at the receiving device in a telecommunication system. In other embodiments of phone-based and/or computer-based status indicators, speech recognition programs and other voice-processing programs can be used to input and/or process voice information.

FIG. 10 shows one embodiment of the status indicator 110, as described with respect to FIG. 1, which inclues a status indicator controller 1000. The communication network 106 can provide for communications that are necessary for the operation of the status indicator 110, as described herein. One embodiment of the status indicator controller 1000 includes a central processing unit (CPU) 1002, a memory 1004, a circuit portion 1006, and an input output interface (I/O) 1008 that may include a bus (not shown). Different embodiments of the status indicator controller 1000 can be a general-purpose computer, a microprocessor, a microcontroller, and/or any other known suitable type of computer or controller that can be implemented in hardware, software, and/or firmware. Certain portions of the status indicator controller 1000 can be physically or operationally configured in the transmitting device 102, the communication network 106, and/or the receiving device 104 as described with respect to FIG. 1. In one embodiment, the CPU 1002 performs the processing and arithmetic operations for the status indicator controller 1000. The status indicator controller 1000 controls the signal processing, database querying and response, computational, timing, data transfer, and other processes associated with the status indicator.

Certain embodiments of the memory 1004 include random access memory (RAM) and read only memory (ROM) that together store the computer programs, operands, and other parameters that control the operation of the status indicator. The bus provides for digital information transmissions between CPU 1002, circuit portion 1006, memory 1004, and I/O 1008. The bus also connects I/O 1008 to the portions of the status indicator that either receive digital information from, or transmit digital information to other portions of the communication system 100.

I/O 1008 provides an interface to control the transmissions of digital information between each of the components in the status indicator controller 1000. The I/O 1008 also provides an interface between the components of the status indicator controller 1000 and different portions of the status indicator. The circuit portion 1006 can include such other user interface devices as a display and/or a keyboard.

In another embodiment, the status indicator controller 1000 can be constructed as a specific-purpose computer such as an application-specific integrated circuit (ASIC), a microprocessor, a microcomputer, or other similar devices.

A distinct status indicator controller 1000 can be integrated into certain embodiments of the transmitting device 102, the receiving device 104, and/or the communication network 106, as described with respect to FIG. 1 or 3. While those embodiments of status indicators that are located at the transmitting device can provide a variety of user status information about the user at the receiving device, another embodiment of the status indicator that is located at the receiving device can provide similar user status information about the user at the transmitting device.

Figure 11:
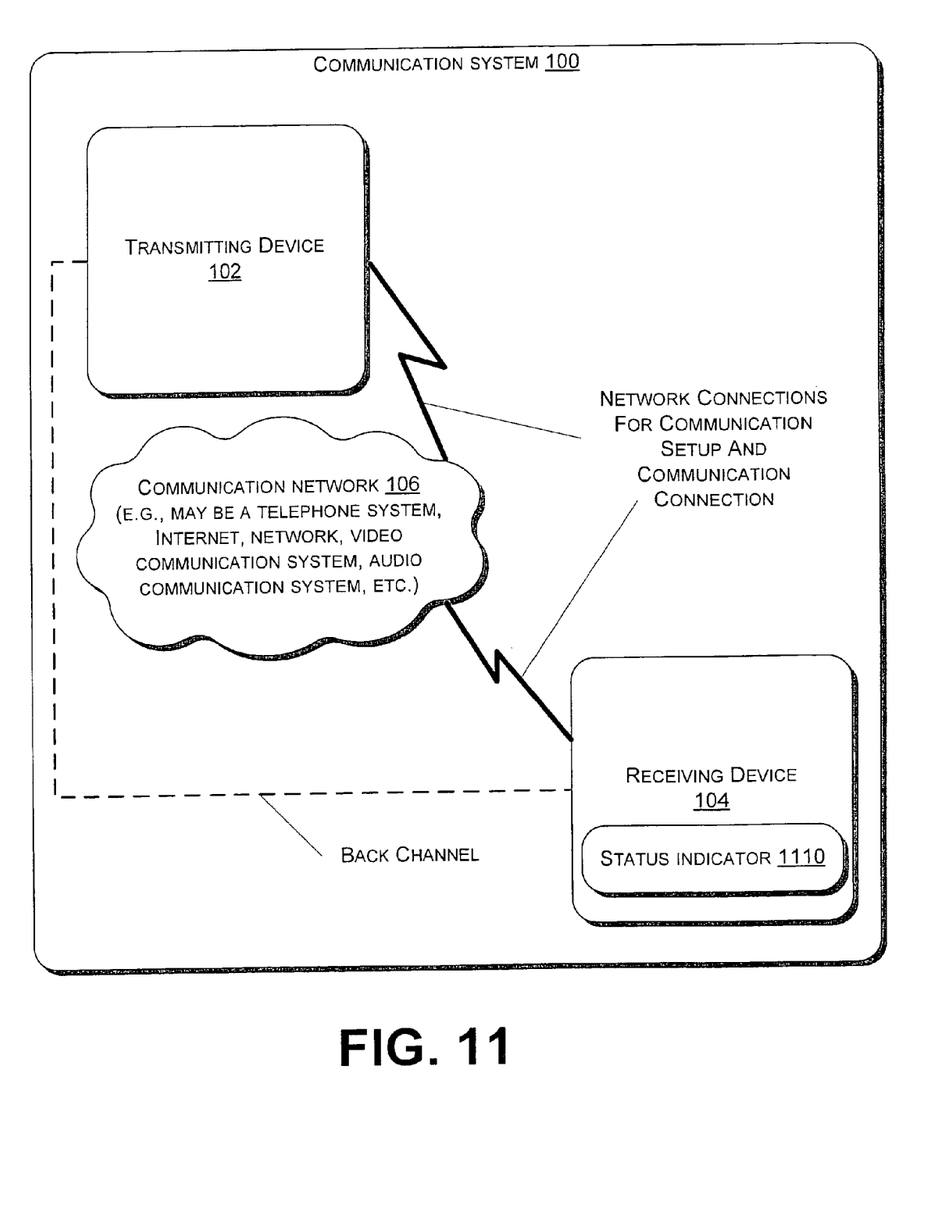
FIG. 11 shows a generalized schematic diagram of another embodiment of a communication system that includes a status indicator located at the receiving device.

FIG. 11 shows a generalized schematic diagram of such an embodiment of a communication system that includes a status indicator located at the receiving device. The above-described embodiments of the status indicator 110 are located in the transmitting device 102, such as described with respect to FIG. 1. These embodiments of the status indicator 100 describe the user status information of the user at the receiving device 104 relative to the transmitting device 102. It is envisioned that there can be other embodiments of the status indicator 1110, as described with respect to FIG. 11, in which the status indicator 110 is located in the receiving device 104. The embodiments of the status indicator 1110 that are included in the transmitting device 102 as described with respect to FIG. 11 act to provide the user status information of a user of the transmitting device 102 to the receiving device 104. The types of user status information, certain aspects of the status indicator, and the techniques to display the user status information in the embodiment of the embodiment of the communication system 100 as described above this disclosure with respect to FIGS. 1 to 10 also apply to the embodiment of the communication system as described with respect to FIG. 11.

FIG. 12 shows a flow diagram of another embodiment of a communication process that involves the status indicator as shown in the communication system 100 of FIG. 11. FIG. 12 shows a diagram of another embodiment of the communication flow chart 200 that establishes a communication between the transmitting device 102 and the receiving device 104 of the communication system 100 using the status indicator 110 as described with respect to FIG. 1. This embodiment of the communication flow chart 200 includes step 202 in which the transmitting device 102 attempts to establish a communication setup with the receiving device 104. The particulars of the communication setup depend largely upon the communication system 100.

The embodiment of the communication flow chart 1200 as described with respect to FIG. 12 continues to step 1204 in which the user status information is forwarded from the transmitting device to the receiving device. The derived user status information corresponds to that type of information which may be displayed, and can be projected over the different embodiments of the status indicator 1110 as described with respect to FIG. 11. As such, the derived user status information in many embodiments may apply to the user status information obtained about the user at the transmitting device 102 and/or the user status information or configuration of the transmitting device to the receiving device 104.

In certain embodiments, at least a portion of the data that is included in the user status information is stored in the transmitting device. In other embodiments, at least part of the data that is included in the user status information is stored at a network location that is located at some operational location between the transmitting device 102 and the receiving device 104.

The embodiment of the communication flow chart 1200 as described with respect to FIG. 12 continues to step 1206, in which the user status information of the transmitting device 102 such as might be displayed over the status indicator 1110 of the receiving device 104 is acquired at the receiving device. Such acquiring of the user status information at the status indicator 1110 of the receiving device 104 in many embodiments acts to the forward the contents of the user status information (or alternatively, the response to signaling or other communications). Thereupon, the user status information is provided to the status indicator 1110 to a user at the receiving device 104. The technique by which the user status information is provided depends largely on the configuration of the status indicator and may include, but is not limited to, displaying the data on a display, projecting the data as voice or audio, etc. Many embodiments of communication flow chart 1200 end at step 1206 at which the user status information of the user at the receiving device 102 is provided to the transmitting device 104. Following the acquiring of the user status information at the status indicator 110 in the receiving device 104, as described with respect to step 1206, certain embodiments of the communication flow chart 200 continue to step 1208 in which the communication setup as attempted in step 1202 is established.

In the embodiment of communication flow chart 1200 as described with respect to FIG. 12, the communication flow chart continues to decision 1210 in which the user at the receiving device 104 is asked whether they desire to establish a communication connection considering the user status information pertaining to the user at the transmitting device that has been presented to the receiving device. If the answer to the decision 1210 is yes, then one embodiment of the communication flow chart 1200 continues to step 1216 in which the communication connection is established between the transmitting device 102 and the receiving device 104 based on the communication setup.

In certain embodiments of the communication flow chart 1200 in which the answer to the decision 1210 is no, the communication flow chart continues to step 1212 in which the communication system does not establish a communication connection. Following step 1212, in one embodiment of the communication flow chart 1200 described with respect to FIG. 12, a user at the transmitting device 102 is provided with an option to leave a message at the receiving device in step 1214, the format and type of the message can vary depending upon the embodiment of the status indicator.

This disclosure provides a number of embodiments of the status indicator that provide a variety of user status information that pertains to the user at a transmitting device to the user at the receiving device, or alternatively, the user status information of a user at the transmitting device to the receiving device. Different embodiments of the status indicators can be included in such embodiments of the communication system 100 as telecommunication systems, computer systems, audio systems, video systems, teleconferencing systems, and/or hybrid combinations of certain ones of these systems. The embodiments of the status indicator as described with respect to this disclosure are intended to be illustrative in nature, and are not limiting its scope.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It is to be understood by those skilled in the art that, in general, that the terms used in the disclosure, including the drawings and the appended claims, are generally intended as "open" terms. For example, the term "including" should be interpreted as "including but not limited to"; the term "having" should be interpreted as "having at least"; and the term "includes" should be interpreted as "includes, but is not limited to"; etc. In this disclosure and the appended claims, the terms "a", "the", and "at least one" are intended to apply inclusively to one or a plurality of those items.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

Those skilled in the art will appreciate that the herein-described specific exemplary processes and/or devices and/or technologies are representative of more general processes and/or devices and/or technologies taught elsewhere herein, such as in the claims filed herewith and/or elsewhere in the present application.

Within this disclosure, elements that perform similar functions in a similar way in different embodiments may be provided with the same or similar numerical reference characters in the figures.

The invention claimed is:

1. A system comprising:
    circuitry configured for receiving one or more requests of at least one first device to establish at least one communication connection with at least one second device;
    circuitry configured for obtaining status information associated with the at least one second device for presentation to a user of the at least one first device, the status information derived from querying information currently stored on the second device;
    and
    circuitry configured for providing, based at least partly on user input of the at least one second device indicating a decline of at least one communication connection at least partly in response to presentation of the status information associated with the at least one user of the at least one first device, (i) at least one option for the at least one user of the at least one first device to enter at least one of a prescribed input to leave one or more messages for the at least one user of the at least one second device, wherein the one or more messages are of a type and format that depend at least partly on the derived status information associated with the at least one second device, and (ii) at least one option for the at least one user of the at least one second device to enter at least a different one of a prescribed input to at least one of alter or re-attempt at least one communication with the at least one first device, wherein the at least one of alter or reattempt depend at least partly on the derived status information associated with the at least one second device.

2. The system of claim 1, wherein the circuitry configured for receiving one or more requests of at least one first device to establish at least one communication connection with at least one second device comprises:
    circuitry configured for receiving one or more requests of at least one first device to establish at least one voice-over-IP communication connection with at least one second device.

3. The system of claim 1, wherein the circuitry configured for obtaining status information associated with the at least one second device for presentation to a user of the at least one first device comprises:
    circuitry configured for obtaining location information associated with the at least one second device for presentation to a user of the at least one first device.

4. The system of claim 1, wherein the circuitry configured for obtaining status information associated with the at least one second device for presentation to a user of the at least one first device comprises:
    circuitry configured for obtaining time information associated with the at least one second device for presentation to a user of the at least one first device.

5. The system of claim 1, wherein the circuitry configured for obtaining status information associated with the at least one second device for presentation to a user of the at least one first device comprises:
    circuitry configured for obtaining device type information associated with the at least one second device for presentation to a user of the at least one first device.

6. The system of claim 1, wherein the circuitry configured for obtaining status information associated with the at least one second device for presentation to a user of the at least one first device comprises:
    circuitry configured for obtaining device configuration information associated with the at least one second device for presentation to a user of the at least one first device.

7. The system of claim 1, wherein the circuitry configured for obtaining status information associated with the at least one second device for presentation to a user of the at least one first device comprises:
    circuitry configured for obtaining condition information associated with the at least one second device for presentation to a user of the at least one first device.

8. The system of claim 1, wherein the circuitry configured for obtaining status information associated with the at least one second device for presentation to a user of the at least one first device comprises:
    circuitry configured for obtaining weather information associated with the at least one second device for presentation to a user of the at least one first device.

9. The system of claim 1, wherein the circuitry configured for obtaining status information associated with the at least one second device for presentation to a user of the at least one first device comprises:
    circuitry configured for obtaining schedule information associated with the at least one second device for presentation to a user of the at least one first device.

10. The system of claim 1, wherein the circuitry configured for obtaining status information associated with the at least one second device for presentation to a user of the at least one first device comprises:
    circuitry configured for obtaining street address information associated with the at least one second device for presentation to a user of the at least one first device.

11. The system of claim 1, wherein the circuitry configured for obtaining status information associated with the at least one second device for presentation to a user of the at least one first device comprises:
    circuitry configured for obtaining GPS information associated with the at least one second device for presentation to a user of the at least one first device.

12. The system of claim 1, wherein the circuitry configured for obtaining status information associated with the at least one second device for presentation to a user of the at least one first device comprises:
    circuitry configured for obtaining landmark information associated with the at least one second device for presentation to a user of the at least one first device.

13. The system of claim 1, wherein the circuitry configured for obtaining status information associated with the at least one second device for presentation to a user of the at least one first device comprises:
    circuitry configured for obtaining commercial location information associated with the at least one second device for presentation to a user of the at least one first device.

14. The system of claim 1, further comprising:
    circuitry configured for forwarding the status information associated with the at least one second device to the at least one first device for display.

15. The system of claim 1, further comprising:
    circuitry configured for providing at least one option for at least one user of the at least one second device to alter one or more communication connections with the at least one first device.

16. The system of claim 1, further comprising:
    circuitry configured for providing at least one option for at least one user of the at least one second device to reattempt one or more communications with the at least one first device.

17. The system of claim 1, further comprising:
    circuitry configured for providing at least one option for at least one user of the at least one first device to leave one or more text messages for the at least one user of the at least one second device.

18. The system as recited in claim 1, wherein the circuitry configured for providing at least one option for at least one user of the at least one first device to leave one or more messages with at least one second device comprises:
    circuitry configured for providing at least one option for at least one user of the at least one first device to leave one or more messages with at least one second device for presentation to a user of the second device.

19. A method at least partly performed using one or more processing devices, the method comprising:
    receiving one or more requests of at least one first device to establish at least one communication connection with at least one second device;
    obtaining status information associated with the at least one second device for presentation to a user of the at least one first device, the status information derived from querying information currently stored on the second device; and
    providing, based at least partly on user input to the at least one second device declining at least one communication connection at least partly in response to presentation of the status information associated with the at least one user of the at least one first device, (i) at least one option for at least one user of the at least one first device to enter at least one of a prescribed input to leave one or more messages for the at least one user of at least one second device, wherein the one or more messages are of a type and format that depend at least partly on the derived status information associated with the at least one first device, and ii) at least one option for the at least one user of the at least one second device to enter at least a different one of a prescribed input to at least one of alter or re-attempt at least one communication with the at least one first device, wherein the at least one of alter or reattempt depend at least partly on the derived status information associated with the at least one second device.

20. The method as recited in claim 19, further comprising setting at least one of a type and a format for the one or more messages depending at least partly on the status information associated with the at least one second device.

21. A computer program product comprising:
    one or more non-transitory media including at least one or more instructions executed by a processor for:
    receiving one or more requests of at least one first device to establish at least one communication connection with at least one second device;
    obtaining status information associated with the at least one second device for presentation to a user of the at least one first device, the status information derived from querying information currently stored on the second device; and
    providing based at least partly on user input to the at least one second device declining at least one communication connection at least partly in response to presentation of the status information associated with the at least one user of the at least one first device, (i) at least one option for at least one user of the at least one first device to enter at least one of a prescribed input to leave one or more messages with at least one second device for presentation to a user of the second device, wherein the one or more messages are of a type and format that depend at least partly on the derived status information associated with the at least one first device, and (ii) at least one option for the at least one user of the at least one second device to enter at least a different one of a prescribed input to at least one of alter or re-attempt at least one communication with the at least one first device, wherein the at least one of alter or reattempt depend at least partly on the derived status information associated with the at least one second device.

* * * * *